United States Patent [19]
Hardtmann

[11] 3,883,652

[45] May 13, 1975

[54] CERTAIN SUBSTITUTED-TRICYCLIC QUINAZOLIN-THIONES USED AS BRONCHODILATORS

[75] Inventor: Goetz E. Hardtmann, Florham Park, N.J.

[73] Assignee: Sandoz-Wander, Inc., East Hanover, N.J.

[22] Filed: Jan. 19, 1973

[21] Appl. No.: 325,078

[52] U.S. Cl. .......................... 424/251; 260/256.5 R
[51] Int. Cl. ............................................ A61k 27/00
[58] Field of Search ............... 260/256.5 R; 424/251

[56] References Cited
UNITED STATES PATENTS

| | | | |
|---|---|---|---|
| 3,296,447 | 1/1967 | Papesch | 260/256.4 F |
| 3,468,888 | 9/1969 | Chow | 260/256.4 F |
| 3,598,823 | 8/1971 | Hardtmann | 260/256.4 F |

OTHER PUBLICATIONS

Journal of Medicinal Chemistry (Vol. 15, No. 7) pp. 727–731 (1972).

*Primary Examiner*—Albert T. Meyers
*Assistant Examiner*—Leonard Schenkman
*Attorney, Agent, or Firm*—Gerald D. Sharkin; Richard E. Vila

[57] ABSTRACT

The compounds are substituted-tricyclic quinazolinthiones of the class of imidazo[2,1-b]quinazolin-5-thiones and pyrimido[2,1-b]quinazolin-6-thiones, e.g., 2,3-dihydro-10-(4'-fluorobenzyl)-imidazo [2,1-b]quinazolin-5(10H)-thione, useful as bronchodilator agents.

5 Claims, No Drawings

CERTAIN SUBSTITUTED-TRICYCLIC QUINAOLIN-THIONES USED AS BRONCHODILOTORS

The present invention relates to tricyclic compounds which are quinazolin-thiones, and to their preparation. The invention also relates to pharmaceutical methods and compositions for utilization of the compounds based on their biological activity.

The present invention provides compounds of the formula I:

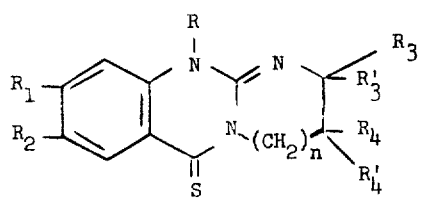

wherein each of $R_1$ and $R_2$ is, independently, hydrogen, halo of atomic weight not greater than 36 or lower alkyl of 1 to 3 carbon atoms, or both are lower alkoxy of 1 to 2 carbon atoms; or one is hydrogen and the other bromo or lower alkoxy of 1 to 2 carbon atoms, n is 0 or 1;

each of $R_3$, $R'_3$, $R_4$ and $R'_4$ is hydrogen or alkyl of 1 to 3 carbons provided that no more than 3 of $R_3$, $R'_3$, $R_4$ and $R'_4$ are alkyl, R is lower alkyl of 1 to 6 carbon atoms,

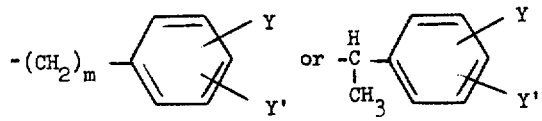

m is 1 or 2, each of Y and Y' is, independently, hydrogen, halo of atomic weight not greater than 36, i.e. fluoro or chloro, or lower alkyl of 1 to 3 carbon atoms, or both are lower alkoxy of 1 to 2 carbon atoms, or one is hydrogen and the other bromo, or lower alkoxy of 1 to 2 carbon atoms, or a pharmaceutically acceptable acid addition salt thereof.

The compounds of the formula I are prepared by reacting a corresponding quinazolinone of the formula II:

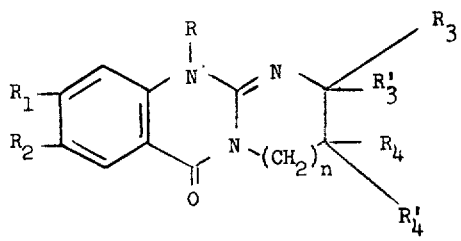

wherein R, $R_1$, $R_2$, $R_3$, $R'_3$, $R_4$, $R'_4$ and n are as defined, with a compound such as phosphorous pentasulfide at elevated temperatures in the presence of an inert organic solvent.

The preparation of compounds of the formula I from the corresponding compounds of the formula II may be effected by known reaction procedures for converting a cyclic ketone function to a cyclic thione function, for example, by reacting the ketone with phosphorous pentasulfide in the presence of an inert organic solvent of conventional type. Said reaction is preferably effected at a temperature of from about 70°C. to 180°C., more preferably from 100°C. to 130°C. Suitable solvents include pyridine, toluene and xylene of which pyridine is most preferred. Reaction times may vary for example from 1 to 50 hours, more typically from 10 to 30 hours. The reaction product of the formula I may be isolated from the resulting reaction mixture by working up by conventional procedures.

The one method for preparation of compounds of formula II involves reacting in a Step A a compound of the formula III:

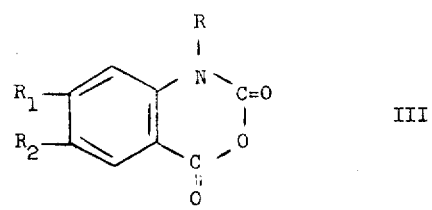

wherein $R_1$, $R_2$ and R are as defined, with a compound of formula IV:

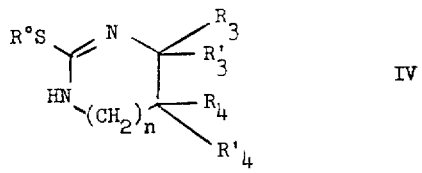

wherein n, $R_3$, $R'_3$, $R_4$ and $R'_4$ are as defined and R° is lower alkyl or benzyl.

The preparation of compounds II by the reaction of Step A can be carried out at temperatures in the range of 20°C. to 160°C., more usually 20°C. to 140°C., preferably 80°C. to 120°C. The reaction is conveniently carried out in an organic solvent of conventional type providing an inert reaction medium. The aromatic solvents and cyclic ethers suitable for use at reflux temperatures represent the preferred solvents, e.g. toluene and dioxane. The reaction is preferably carried out in the presence of a base, e.g. sodium hydroxide or sodium carbonate; and when the compound IV is employed directly in acid addition salt form, it is of course desirably to employ an amount of base somewhat greater than the amount necessary to neutralize the acid. In general, the reaction product of formula II may be recovered from the reaction of Step A by working up by conventional procedures.

The compounds of formula II may be also prepared by reacting in a Step B a compound of the formula V:

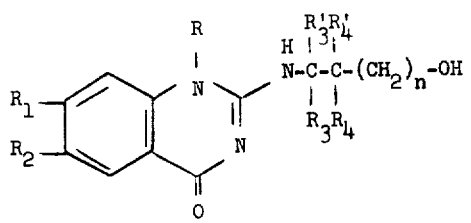

in which R, R$_1$, R$_2$, R$_3$, R'$_3$, R$_4$, R'$_4$ and n are as above-defined, with a cyclizing agent, and treating the reaction product with an acid binding agent.

The preparation of compounds I from compounds V involves a cyclization of known type carried out by treating a compound V with a reagent suitable for such type of cyclization, for example, a phosphorus halide or thionyl halide in which the halide has an atomic weight of from 35 to 80, i.e. the chloride or bromide, more preferably the chloride. The preferred reagent is thionyl chloride. The reaction with the cyclizing reagent may be carried out in absence of a solvent or in the presence of inert solvents of known type, e.g. the halogen-containing hydrocarbons such as methylene chloride and chloroform, and the aromatic solvents such as benzene and pyridine. An excess of the cyclizing agent may, however, where appropriate, be employed to provide a solvent. The treatment with an acid-binding agent, e.g., an inorganic base or tertiary amine, is preferably effected after removal of the remaining cyclizing reagent. The reaction product of formula II may be isolated from the reaction mixture by working up by established procedures.

The compounds of the formulae III, IV and V are either known or may be prepared from known materials by the procedures established for the known compounds.

Also within the scope of the compounds of the formula I of the invention are pharmaceutically acceptable salts not materially depreciating the pharmacological effect of the compounds. Such salts include the acid addition salts of known type, e.g., the hydrochloride. The acid addition salts may be produced from the corresponding free bases by conventional procedures. Conversely, the free bases may be obtained from the salts by procedures known in the art.

The compounds of formula I of the invention are useful because they possess biological activity. In particular, the compounds of the formula I are useful as bronchodilator agents as indicated by measuring bronchial resistance on intravenous administration (0.1 – 5 mgs./kgs.) in the anesthetized guinea pig and according to the test of Konzett and Rossler, Arch. Exp. Path. and Pharmak. 195:71 (1940); and by observing the respiratory status on oral administration (0.5 – 100 mgs./kgs.) to the unanesthetized guinea pig exposed to aerosolized histamine dihydrochloride according to a modification of the method of Van Arman et al., J. Pharm. Pharmacol. Exptl. Therap. 133:90–97, 1961; and in vitro by observing the effect (0.1 – 30 micrograms/ml.) on strips of guinea pig trachea according to the method of Constantine, J. Pharm. Pharmacol. 17: 384–385, 1960. For such use and depending upon known variables satisfactory results are obtained in general on the daily administration of from 1.0 to 100 milligrams per kilogram of body weight, preferably given in divided doses 2 to 4 times a day, or in sustained release form. For most mammals the administration of from 60 to 1500 milligrams per day provides satisfactory results and dosage forms suitable for internal administration comprise 15 to 750 milligrams of the compound in admixture with a solid or liquid pharmaceutical carrier or diluent.

The preferred compounds of the invention from the standpoint of bronchodilator activity, e.g. in the histamine aerosol assay, are those in which R is benzyl including substituted benzyl, particularly unsubstituted benzyl and those which have a 4-halo substituted-benzyl, and the more preferred such compounds are those in which each of R$_1$ and R$_2$ is hydrogen, and those in which n is 0, e.g. 10-benzyl-2,3-dihydro-imidazo[2,1-b] quinazolin-5(10H)-thione. The especially preferred such bronchodilators are those in which R is 4-halobenzyl (i.e. 4-fluoro-, 4-chloro- and 4-bromobenzyl), particularly those in which n is 0, e.g. 10-(4-chlorobenzyl)-2,3-dihydro-imidazo[3,1-b]quinazolin-5(10H)-thione and 10-(4'-fluorobenzyl)-2,3-dihydro-imidazo[2,1-b]quinazolin-5(10H)-thione, and the latter is the most especially preferred compound.

For the use indicated above, the compounds may be combined with a pharmaceutically acceptable carrier, and such other conventional adjuvants as may be necessary, and administered orally or parenterally. For most uses, oral administration with carriers is preferred and may take place in such conventional forms as tablets, dispersible powders, granules, capsules, suspensions, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium phosphate, calcium sulphate dihydrate, lactose and talc, granulating and disintegrating agents, e.g., starch and alginic acid, binding agents, e.g., starch, gelatin, polyvinyl pyrrolidone and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxy-benzoate). Capsules may contain the active ingredient alone or admixed with an inert solid diluent, e.g., calcium carbonate, calcium phosphate and kaolin. The preferred pharmaceutical compositions from the standpoint of preparation and ease of oral administration are solid compositions, particularly hard-filled capsules and tablets. Parenteral administration may be in such conventional forms as injectionable solutions and suspensions.

A representative formulation is a tablet for oral administration 2 to 4 times a day for prophylatic treatment of bronchial asthma and prepared by conventional tabletting techniques to contain the following ingredients:

| Ingredients | Weight (mg.) |
| --- | --- |
| 10-(4'-fluorobenzyl)-2,3-dihydro-imidazo[2,1-b]quinazolin-5(10H)-thione | 25 |
| Tragacanth | 10 |
| Lactose | 222.5 |
| Corn Starch | 25 |
| Talcum | 15 |
| Magnesium Stearate | 2.5 |

A representative formulation is also a capsule for oral administration 2 to 4 times a day for prophylatic treatment of bronchial asthma and prepared by conventional capsulating techniques to contain the following ingredients:

| Capsule Ingredients | Weight (Mg.) |
| --- | --- |
| 10-(4'-fluorobenzyl)-2,3-dihydro-imidazo[2,1-b]quinazolin-5(10H)-thione | 25 |
| Lactose | 316 |
| Sterotex K (a triglycerol ester lubricant) | 10 |

In addition, the compounds of the formula I may be administered as bronchodilators by inhalation therapy in a conventional manner, e.g., by the use of nebulizers, vaporizers, aerosols and the like. Compositions for use in administration by inhalation therapy may be prepared accordingly to conventional procedures and contain the usual conventional ingredients employed in such compositions. A representative aerosol formulation prepared by conventional techniques for use with a metered value system contains the following ingredients:

| 10-(4'-fluorobenzyl)-2,3-dihydro-imidazo[2,1-b]quinazolin-5(10H)-thione | 0.4 – 20% |
| --- | --- |
| Ethyl alcohol | 10 – 40% |
| Ascorbic acid | 1 – 10% |
| Freon 11 | 10 – 30% |
| Freon 114 | 10 – 30% |
| Freon 12 | 30 – 60% |
| Buffer System pH control | q.s. |
| Flavor | q.s. |

The following examples show representative compounds encompassed within the scope of this invention and the manner in which such compounds are prepared. However, it is to be understood that the examples are for purposes of illustration only.

EXAMPLE A 10-(4'-fluorobenzyl)-2,3-dihydro-imidazo[2,1-b]quinazolin-5(10H)-one

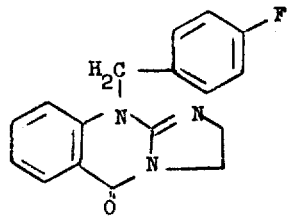

Step A: Preparation of N-(p-fluorobenzyl)isatoic anhydride

To a solution of 3.2 kgs. isatoic anhydride in 15 kgs. dimethylacetamide is added under nitrogen with stirring sodium hydride obtained from 880 gms. of a 57 percent dispersion in mineral oil, while maintaining the temperature below 25°C. The resulting mixture is heated to about 60°C. and held at about 55° – 60°C. for 1 hour. The reaction mixture is then cooled to 20° – 30°C. and to it is added 3.0 kgs. p-fluorobenzyl chloride. The mixture is then reheated to about 60°C. and held there for about 4 hours. It is then cooled again to 20°C. and to it is added 17.4 kgs. of ice and then 24 kgs. water. The mixture is stirred for 15 minutes, the solids collected by filtration, washed with several 2 kg. portions of water and then three times with 0.7 kg. diethylether. The washed solids are dried to obtain N-(p-fluorobenzyl)isatoic anhydride, m.p. 140°–143° C.

Step B: Preparation of 10-(4'-fluorobenzyl)-2,3-dihydroimidazo[2,1-b]quinazolin-5(10H)-one A charge of 26 kgs. toluene, 2.5 kgs. 2-methylmercaptoimidazoline hydroiodide, 2.4 kgs. N-(p-fluorobenzyl)isatoic anhydride and 1.55 kgs. powdered anhydrous sodium carbonate is refluxed for 18 – 20 hours in a reaction vessel which is vented to a caustic gas washing tower. Any water formed during the reaction is collected in a Dean-Stark separator. The reaction is cooled to 20°C. and 10 kgs. water added. The mixture is stirred for about 30 minutes and the solids collected, washed several times with 2 kg. portions of water, and three times with 0.8 kg. toluene. The solids are then dried at reduced pressure (about 55°C.) to obtain a crude product, m.p. 196°–198°C. The crude is dissolved at 50°C. in a solution of 14 kgs. chloroform and 4 kgs. ethanol and treated in solution with 0.1 kg. decoloring charcoal for about 10 minutes. The charcoal is removed by filtration through a celite bed and solids reprecipitated by concentrating the filtrate to a volume of about 8 liters. This concentrate is cooled to 0°–5°C., the solids collected by filtration, washed with cold ethanol and then diethyl ether, and dried at reduced pressure to obtain 10-(4'-fluorobenzyl)-2,3-dihydro-imidazo[2,1-b]-quinazolin-5(10H)-one, m.p. 197-198°C.

EXAMPLE 1

10-(4'-fluorobenzyl)-2,3-dihydro-imidazo[2,1-b]quinazolin-5(10H)-thione

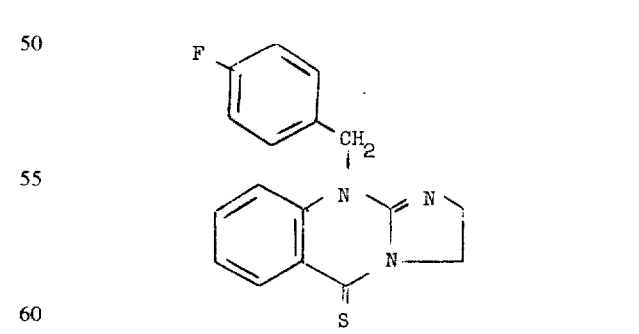

A mixture of 6 g. of 10-(4'-fluorobenzyl)-2,3-dihydro-imidazo [2,1-b]quinazolin-5(10H)-one, 18 g. of phosphorous pentasulfide and 180 ml. of pyridine is refluxed for 5 hours and then evaporated in vacuo to dryness. The residue is heated with hot water, filtered, washed with water, dissolved in methylene chloride, dried, treated with alumina and charcoal and then filtered through celite. Addition of ether precipitate which is filtered off, washed with ether and dried under reduced pressure to obtain 10-(4'-flurorbenzyl)-2,3-dihydro-imidazo[2,1-b]quinazolin-5(10H)-thione, m.p. 222°–224°C. Additional amounts of the title compound are obtained from the mother liquid.

EXAMPLE 2

Following the procedure of Examples 1 and 2 the following compounds of the invention are prepared.

A. 10-methyl-2,3-dihydro-imidazo[2,1-b]quinazolin-5(10H)-thione.

B. 10-methyl-7-chloro-2,3-dihydro-imidazo[2,1-b]quinazolin-5(10H)-thione.

C. 10-benzyl-2,3-dihydro-imidazo[2,1-b]quinazolin-5(10H)-thione.

D. 10-pentyl-2,3-dihydro-imidazo[2,1-b]quinazolin-5(10H)-thione.

E. 10-phenethyl-2,3-dihydro-imidazo[2,1-b]quinazolin-5(10H)-thione.

F. 10-(α-methyl-benzyl)-2,3-dihydro-imidazo[2,1-b]quinazolin-5(10H)-thione.

G. 10-(3',4-dimethoxybenzyl)2,3-dihydro-imidazo[2,1-b] quinazolin-5(10H)-thione.

H. 10-(2'-methylbenzyl)-2,3-dihydro-imidazo[2,1-b]quinazolin-5(10H)-thione.

I. 10-(4'-fluorobenzyl)-2,3-dimethyl-2,3-dihydro-imidazo [2,1-b]quinazolin-5(10H)-thione.

J. 10-(4'-fluorobenzyl)-2,2-dimethyl-2,3-dihydro-imidazo [2,1-b]quinazolin-5(10H)-thione.

K. 11-(4'-fluorobenzyl)-2,3,4,11-tetrahydropyrimido[2,1-b] quinazolin-6-thione.

L. 11-(4'-fluorobenzyl)-3-methyl-3-ethyl-2,3,4,11-tetrahydropyrimido[2,1-b]quinazolin-6-thione.

What is claimed is:

1. A method of effecting bronchodilation in mammals in need thereof comprising administering to said mammals, a bronchodilating effective amount of a compound of the formula:

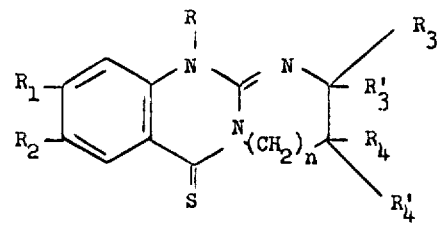

wherein each of $R_1$ and $R_2$ is, independently, hydrogen, fluoro chloro or alkyl of 1 to 3 carbon atoms, or both are alkoxy of 1 to 2 carbon atoms; or one is hydrogen and the other bromo or alkoxy of 1 to 2 carbon atoms, n is 0 or 1;

each of $R_3$, $R'_3$, $R_4$ and $R'_4$ is hydrogen or alkyl of 1 to 3 carbons provided that no more than 3 of $R_3$, $R'_3$, $R_4$ and $R'_4$ are alkyl, R is alkyl of 1 to 6 carbon atoms,

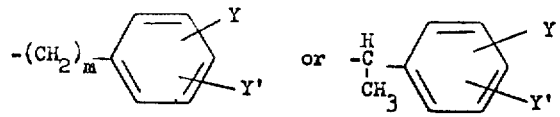

m is 1 or 2, each of Y and Y' is, independently, hydrogen, fluoro, chloro or alkyl of 1 to 3 carbon atoms, or both are alkoxy of 1 to 2 carbon atoms, or one is hydrogen and the other bromo or alkoxy of 1 to 2 carbon atoms, or a pharmaceutically acceptable acid addition salt thereof.

2. The method of claim 1 in which the compound is 10-(4'-fluorobenzyl)-2,3-dihydro-imidazo[2,1-b]quinazolin5(10H)-thione.

3. The method of claim 1 in which the compound is 10-benzyl-2,3-dihydro-imidazo[2,1-b]quinazolin-5(10H)-thione.

4. The method of claim 1 wherein R is unsubstituted benzyl or 4-fluoro, 4-chloro or 4-bromo substituted benzyl, each of $R_1$ and $R_2$ is hydrogen and n is 0.

5. The method of claim 1 wherein either both $R_3$ and $R'_3$ are alkyl or both $R_4$ and $R'_4$ are alkyl.

* * * * *